Figure 1:
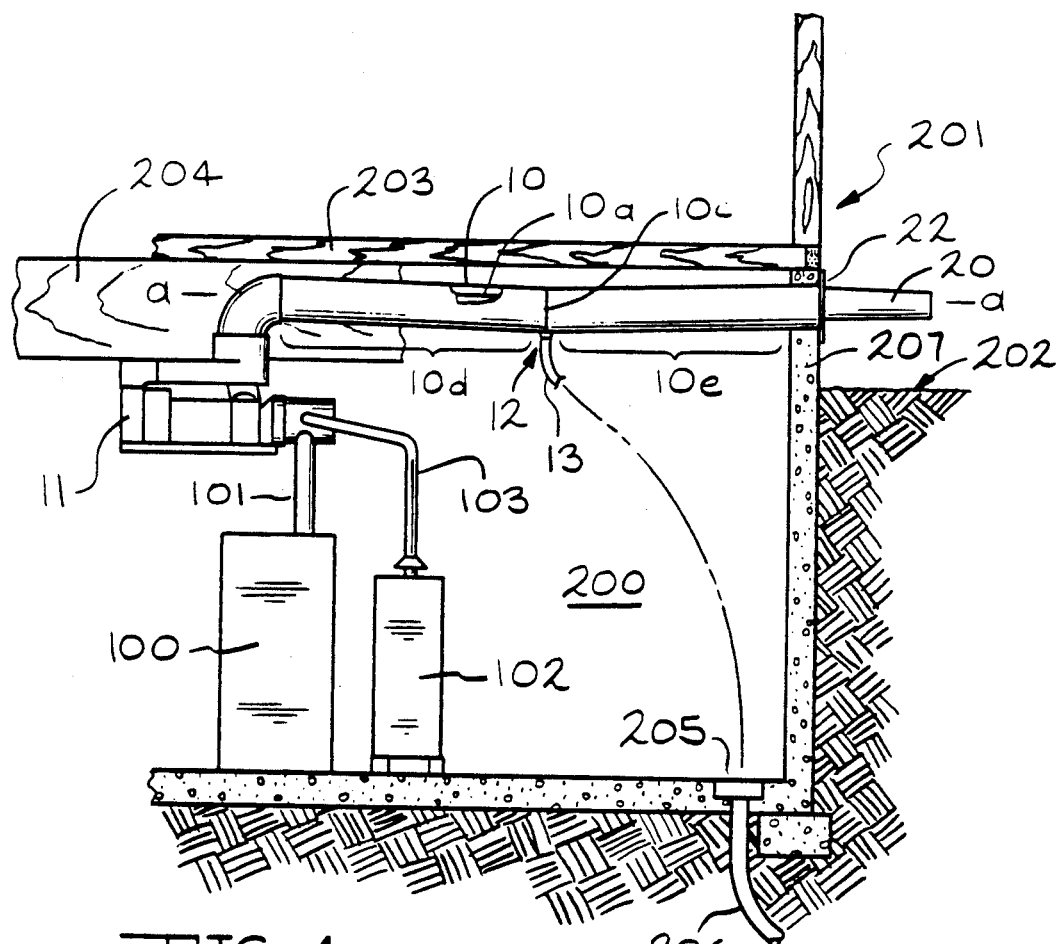

United States Patent [19]
Jackson

[11] Patent Number: 4,995,375
[45] Date of Patent: Feb. 26, 1991

[54] HEAT EXCHANGE PIPES FOR A FURNACE SYSTEM

[76] Inventor: Bert W. Jackson, 1219 Garfield Rd., Lansing, Mich. 48917

[21] Appl. No.: 502,816

[22] Filed: Apr. 2, 1990

[51] Int. Cl.$^5$ .............................................. F24C 3/00
[52] U.S. Cl. .................................. 126/85 B; 110/203; 165/921; 431/215
[58] Field of Search ...................... 110/203; 126/85 B; 431/215; 165/921; 122/20 B

[56] References Cited

U.S. PATENT DOCUMENTS

| | | | |
|---|---|---|---|
| 4,175,518 | 11/1979 | Reames, Jr. | 122/20 B |
| 4,227,647 | 10/1980 | Eriksson | 122/20 B X |
| 4,262,608 | 4/1981 | Jackson | 110/162 |
| 4,289,730 | 9/1981 | Tomlinson | 110/203 X |
| 4,633,821 | 1/1987 | Cleer, Jr. | 122/20 B X |
| 4,651,710 | 3/1987 | Henault | 126/85 B |
| 4,690,129 | 9/1987 | Halstead | 126/85 B |

*Primary Examiner*—Edward G. Favors
*Attorney, Agent, or Firm*—Ian C. McLeod

[57] ABSTRACT

An assembly using horizontally oriented heat exchange pipes (10, 10a) and a blower unit (11) for providing heated air adjacent to a furnace (100) and hot water heater (102) is described. The blower unit includes heat exchanger pipes with a downwardly inclined section (10d) and an upwardly inclined section (10e) from horizontal to and from a low point (10c) with a drain (12) for condensed liquids from the flue products exhaust pipe (10a) at the low point. The drain removes condensed liquids which are highly corrosive from the exhaust products pipe without allowing flue gases to pass through the drain.

12 Claims, 3 Drawing Sheets

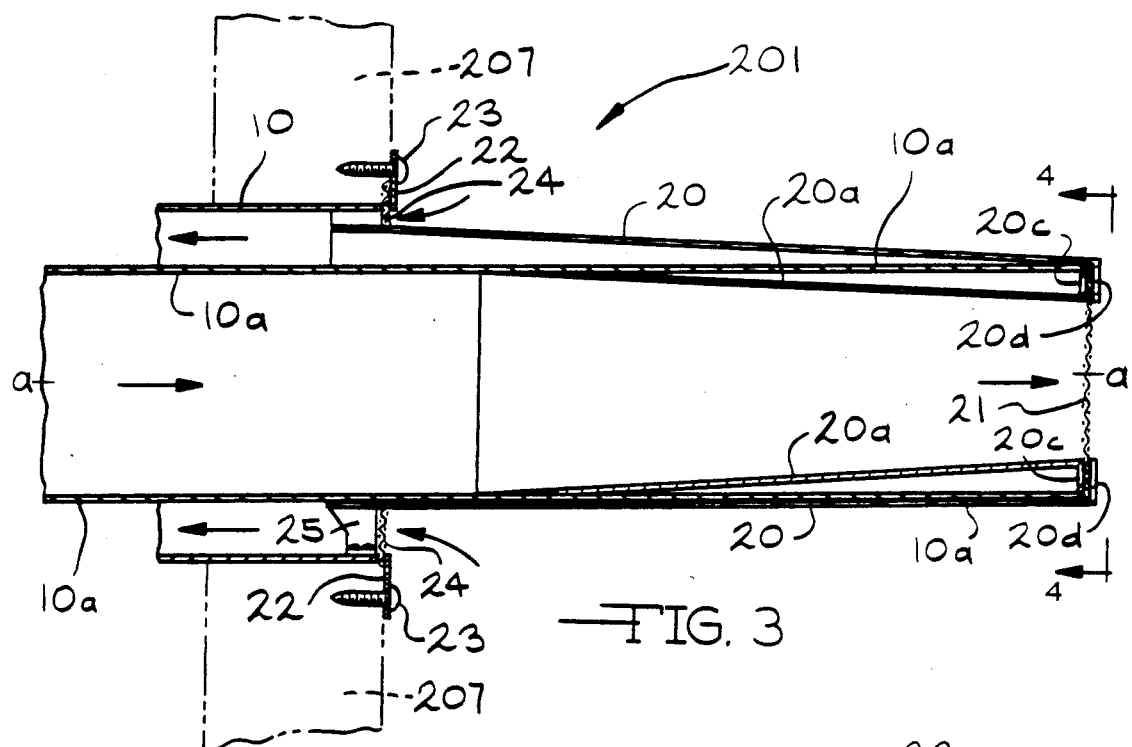
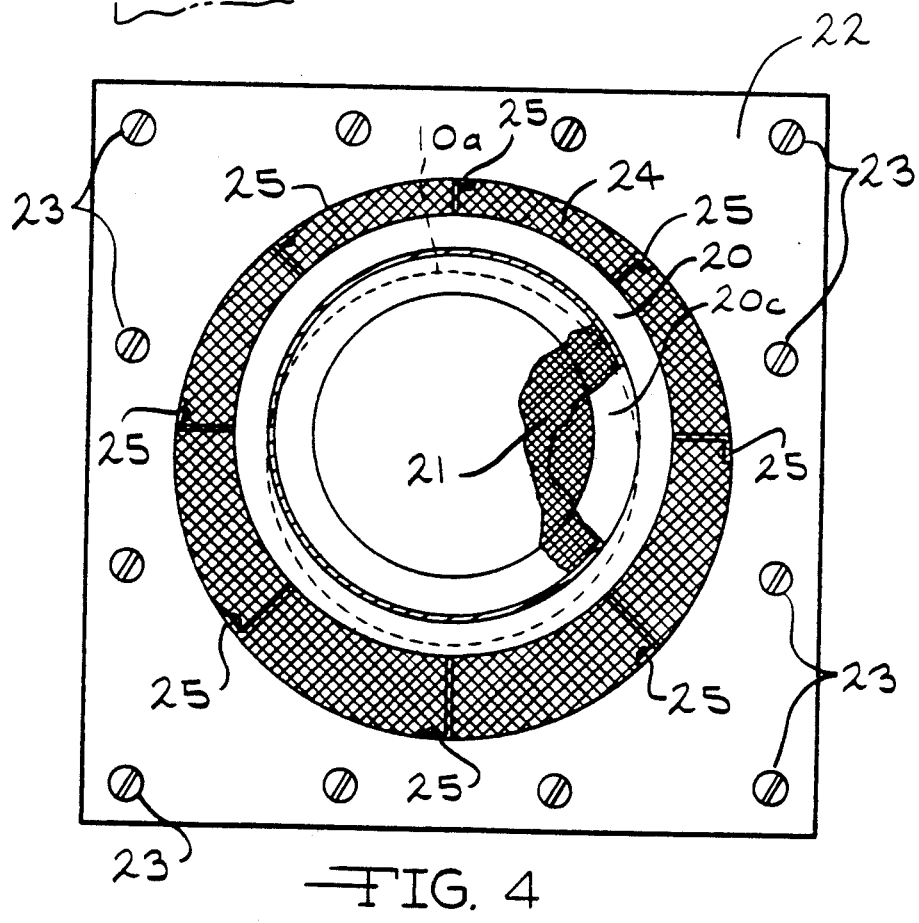

4,995,375

HEAT EXCHANGE PIPES FOR A FURNACE SYSTEM

BACKGROUND OF THE INVENTION

1. Field of the Invention

The present invention relates to an improvement in heat exchange pipes which exhaust flue products from and provides preheated combustion air to a furnace. In particular the present invention relates to an improvement in such heat exchange pipes which are horizontally oriented to extend outside of a building.

2. Prior Art

U.S. Pat. No. 4,262,608 to Jackson shows a blower unit for providing heated combustion air around a furnace through heat exchange pipes with an air intake pipe surrounding a flue products exhaust pipe from the furnace so as to provide heated air around a furnace in a building. One variation described includes heat exchange pipes which are horizontally oriented to extend outside the building. This construction is particularly advantageous where an existing building is to be retrofitted with the blower unit and heat exchange pipes. The blower unit of U.S. Pat. No. 4,262,608 works very well; however, a problem arose in that water condensing in the inner flue products exhaust pipe contained $SO_x$ and other absorbed combustion products from the fuel (natural gas or oil) which are highly corrosive. As a result, the exhaust product pipe could be perforated, thus allowing flue products to escape into the outer air intake pipe which was hazardous. Thus there was a need to solve this problem in a manner which was simple and economical.

OBJECTS

It is therefore an object of the present invention to provide an apparatus for use with a horizontally oriented heat exchange pipes and wherein the condensed liquids are removed from the flue products exhaust pipe before they can perforate the pipe. Further, it is an object of the present invention to provide an apparatus which is simple and economical. These and other objects will become increasingly apparent by reference to the following description and the drawings.

IN THE DRAWINGS

FIG. 1 is a front cross-sectional view of a building 201 showing horizontal heat exchange pipes 10 and 10a for exhausting flue gases (pipe 10a) and heating air pipe 10 for the furnace 100 and water heater 102.

Figure 2:
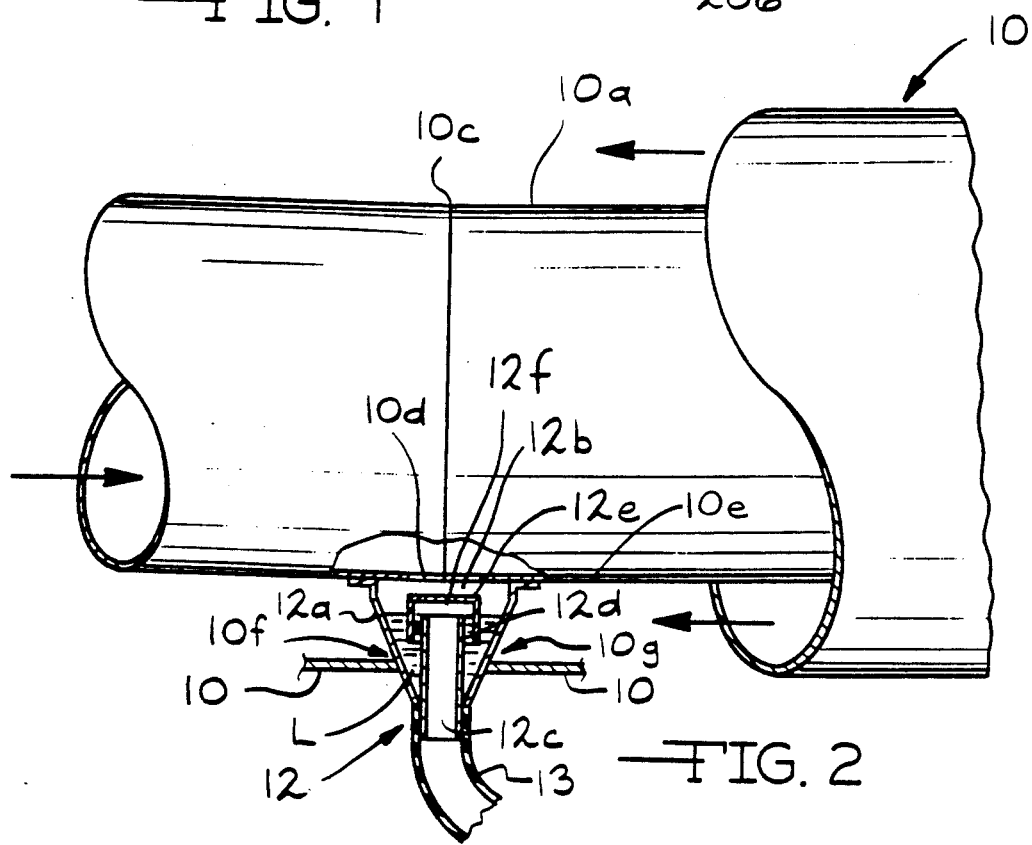

FIG. 2 is an enlarged cross-sectional view of the pipes 10a showing a drain 12 from a flue products exhaust pipe 10a through heated air intake pipe 10.

FIG. 3 is a cross-sectional front view of the horizontal pipes 10 and 10a where they penetrate the building 201, showing a cover 20 around the pipe 10a outside of a wall 207.

FIG. 4 is a right end view of the horizontal pipes 10 and 10a of FIG. 3 particularly showing screens 21 and 24 for the exhaust product pipe 10a and the air intake pipe 10, respectively.

Figure 5:
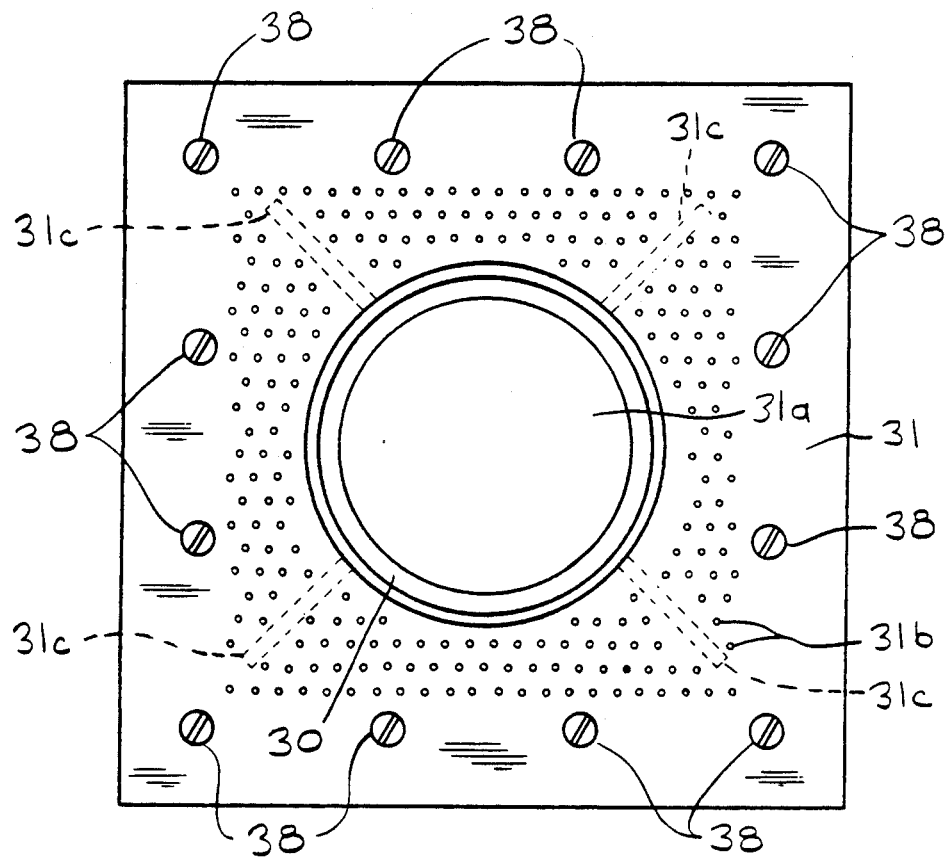

FIG. 5 is a front view of a cover 30 and plate 31 for the pipe 10a with perforations 31b for inlet air to pipe 10.

Figure 6:
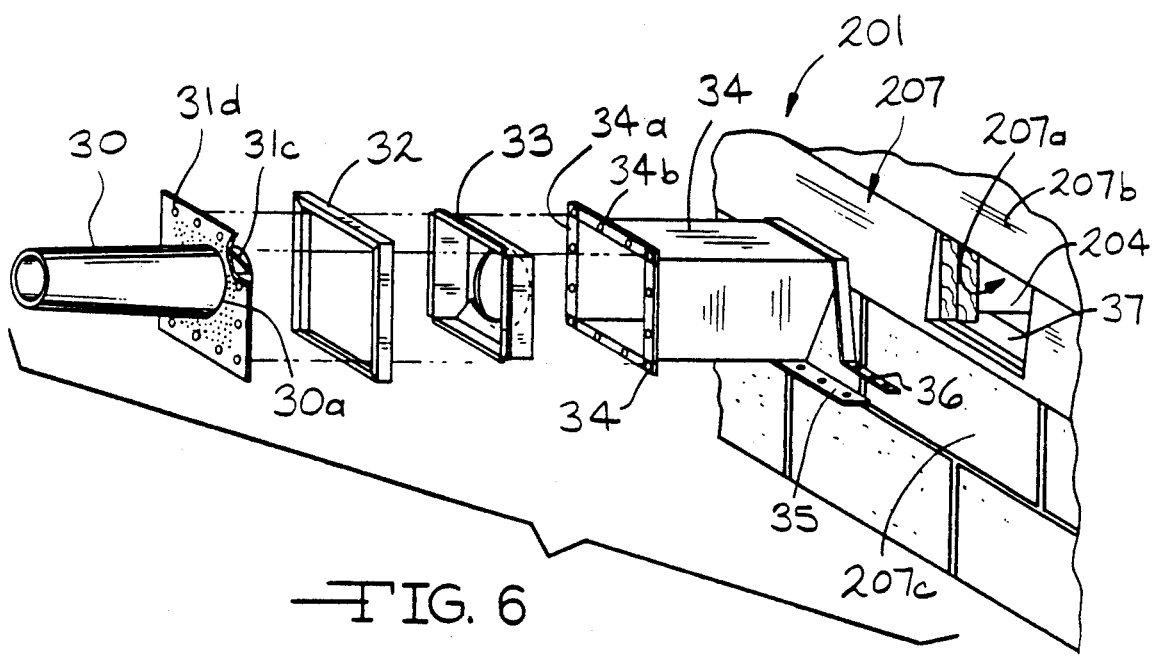

FIG. 6 is an expanded perspective view of a preferred assembly for mounting the pipes 10 and 10a through the wall 207 of a building 201.

GENERAL DESCRIPTION

The present invention relates to a flue products exhaust and preheated combustion air supply assembly for use in association with a heating furnace wherein an air intake pipe is provided outside of and around an exhaust product pipe and wherein each of the pipes extend horizontally to openings outside of a building, the improvement which comprises: an air intake pipe and exhaust products pipe having a downwardly inclined section and then an upwardly inclined section from a horizontal axis with a lowest point between the inclined sections and between the furnace and the openings outside of the building into which liquid condenses from the flue products and with a conduit means from the exhaust product pipe through the air intake pipe in a sealed relationship at the lowest point for removing the condensed liquid; and a drain means connected to the conduit means to empty the condensed liquid from the conduit means.

The drain means is preferably designed so as to provide a liquid seal, thereby preventing gaseous flue products from escaping into the drain. The liquid seal is preferably provided in a reservoir which holds the liquid at a level such that the flue gases can not pass through the reservoir into a drain tube in the reservoir.

SPECIFIC DESCRIPTION

FIG. 1 shows a horizontally oriented heat exchange air inlet and flue products exhaust pipes 10 and 10a connected to a blower unit 11 as shown in U.S. Pat. No. 4,262,608. Pipe 10 is the air inlet pipe and pipe 10a is the flue products exhaust pipe. Furnace 100 is connected by pipe 101 to blower unit 11 which exhausts flue products. Hot water heater 102 is connected by pipe 103 to the unit 11 which exhaust flue products. The furnace 100, hot water heater 102, unit 11 and heat exchanger pipes 10 and 10a are mounted in a space 200 of a building 201, usually in a basement area below ground level 202 and below a floor 203 with unit 11 mounted on a floor joist 204. A pipe drain 12 is connected to hose 13 which leads to a floor drain 205 emptying into sewer pipe 206.

The position and construction of the drain 12 is shown in FIG. 2. The pipes 10 and 10a are constructed so as to have a low point 10c between downwardly inclined section 10d and upwardly inclined sections 10e from a horizontal line a—a. The inclined sections 10d and 10e allow liquid condensed from the flue products in flue products exhaust pipe 10a to drain to the lowest point 10c. Preferably the angle of the inclined sections 10d and 10e is between about 0.5 and 10 degrees. The drain 12 includes a reservoir 12a with opposed openings 12b and 12c. The reservoir 12a with opening 12b is sealed to an opening 10d from the flue products exhaust pipe 10a and is sealed through an opening 10f of air inlet pipe 10. A tube 12d projects vertically into the reservoir 12a around opening 12c to a level below opening 10d of pipe 10. A cap 12e is secured to the tube 12d and has an open space 12f which allows the liquid L to drain out through opening 12c in tube 12d. As can be seen, the liquid L provides a barrier to gaseous flue products from flue products exhaust pipe 10a passing through tube 12d and a hose 13. The reservoir 12a fills with liquid L after a short period of operation of the furnace 100 and hot water heater 102.

The drain 12 is made of acid resistant stainless steel since the liquid L contains strong acids, particularly sulfuric acid. The hose 13 is also acid resistant and resistant to heat transferred from the drain 12 and pipe 10a.

FIG. 3 shows the pipes 10 and 10a where they exit from the building 201 through a concrete basement wall 207. The flue products exhaust pipe 10a is provided with a cover 20 which provides a concentric outside appearance around the horizontal axis a—a. The cover 20 includes a screen 21 covering the opening from the flue products exhaust pipe 10a and a circular cross-sectioned inside mounting tube 20a which fits inside pipe 10a to support the cover 20. The screen 21 is positioned between lips 20c and 20d of cover 20. A flange 22 is secured to the wall 207 by screws 23 and mounts a screen 24. The screen 24 is supported by brackets 25 mounted in pipe 10 adjacent to the opening from the pipe 10.

FIGS. 5 and 6 show a variation of the mounting of a cover 30 for the pipes 10 and 10a (not shown). The cover 30 is mounted on a plate 31 so that there is an opening 31a for inserting the pipe 10a. Angle pieces 31c are secured such as by welding to an extension 30a of the cover 30. The plate 31 has perforations 31b for an inlet to pipe 10. A decorative frame 32 is optionally used to frame the plate 31. An air intake plenum 33 is provided around pipe 10. The assembly including the cover 30 and plate 31, frame 32 and plenum 33 is supported inside a supporting sleeve 34. The sleeve 34 is mounted through an opening 207a in wall 207. As shown in FIG. 6, the opening 207a is in the siding 207b and above a block wall 207c. A bracket or clamp 35 and 36 is used to secure the sleeve 34 to a rafter such as rafter 204 of FIG. 1. A plate 37 is optionally secured to the rafter 204 to provide more support for the sleeve 34. Screws 38 are mounted through openings 31d in the plate 31 and through openings 34b in a flange 34a of support 34 into the wall 207 to secure the assembly in place in opening 207a.

In use, the air flows into an intake pipe 10 as shown by the arrows in FIGS. 2 and 3. Flue products exhaust through the flue products exhaust pipe 10a as shown by the arrows. The blower unit 11 produces the flow of the gases in the pipes 10 and 10a and operates as described by U.S. Pat. No. 4,262,608. This unit 11 has fans (not shown) for removing flue products through flue products exhaust pipe 10a and for bringing air across the pipe 10a to heat the air and discharge heated air adjacent to the furnace. Accumulated liquid is thereby drained through drain 12.

It is intended that the foregoing description be only illustrative of the present invention and that the present invention be limited only by the hereinafter appended claims.

I claim:

1. In a flue products exhaust and preheated combustion air supply assembly for use in association with a heating furnace wherein an air intake pipe is provided outside of and around an exhaust product pipe and wherein each of the pipes extend horizontally to openings outside of a building, the improvement which comprises:
   (a) an air intake pipe and exhaust products pipe having a downwardly inclined section and then an upwardly inclined section from a horizontal axis with a lowest point between the inclined sections and between the furnace and the openings outside of the building into which liquid condenses from the flue products and with a conduit means from the exhaust product pipe through the air intake pipe in a sealed relationship at the lowest point for removing the condensed liquid; and
   (b) a drain means connected to the conduit means to empty the condensed liquid from the conduit means.

2. The system of claim 1 wherein the drain means is provided with a liquid barrier means which prevents flue gases from passing through the conduit means.

3. The system of claim 2 wherein the barrier means is a vertically oriented drain tube having opposed openings and mounted in a liquid reservoir connected to the conduit means and having sides and a bottom through which the drain tube passes, wherein the drain tube is sealed to the bottom of the reservoir with one of the openings leading from the reservoir and extends into the reservoir and to the other of the openings and wherein a cap means is mounted on the other of the openings so that the liquid flows into the reservoir from the conduit means and covers the portion of cap means such that flue products are trapped in the cap means thereby preventing flue products from entering the drain tube when the liquid is in the reservoir covering a portion of the cap means and allowing the liquid to pass through the drain tube.

4. The system of claim 3 wherein the cap means is shaped as a cup and is mounted over the other of the openings of the drain tube so that the liquid can pass from the reservoir and through the tube without allowing the flue products to enter the drain tube when the liquid is in the reservoir.

5. The system of claim 1 wherein a cover means is mounted on an extension of the upwardly inclined section of the exhaust products pipe adjacent the opening from the exhaust product pipe outside of the building to provide a concentric outside appearance of the extension of the exhaust product pipe around the horizontal axis outside of the building.

6. The system of claim 5 wherein perforated means are provided on the cover means over the opening into and from the air intake pipe.

7. The system of claim 5 wherein the cover means has a mounting tube secured inside which mounts inside the extension of the exhaust products pipe and has a larger second tube over the mounting tube which provides the cover means over the exhaust products pipe.

8. The system of claim 6 wherein the cover means has an inside mounting tube which mounts inside the extension of the exhaust products pipe inclined from and has a larger second mounting tube which provides the cover means over the exhaust products pipe.

9. The system of claim 5 wherein the air intake pipe is essentially flush with an outside surface of the building.

10. The system of claim 5 wherein the cover means for the air intake pipe is a tube mounted on a perforated plate covering the air intake pipe which is secured to the building.

11. The system of claim 10 wherein the perforated plate is mounted on a plenum means for air inlet and which mounts the air intake pipe, wherein the plenum means is supported through a wall of the building by a sleeve means and wherein the plate, plenum means and sleeve means are secured together to the wall of the building.

12. The system of claim 11 wherein the plate, plenum means and sleeve means have an essentially square cross-section perpendicular to the horizontal axis.

* * * * *